(12) United States Patent
Domit et al.

(10) Patent No.: US 10,305,124 B2
(45) Date of Patent: May 28, 2019

(54) RESILIENT FLOW STRUCTURES FOR ELECTROCHEMICAL CELL

(71) Applicant: Nuvera Fuel Cells, LLC, Billerica, MA (US)

(72) Inventors: Ed Domit, Westford, MA (US); Scott Blanchet, Chelmsford, MA (US)

(73) Assignee: Nuvera Fuel Cells, LLC, Billerica, MA (US)

(*) Notice: Subject to any disclaimer, the term of this patent is extended or adjusted under 35 U.S.C. 154(b) by 92 days.

(21) Appl. No.: 15/410,840

(22) Filed: Jan. 20, 2017

(65) Prior Publication Data

US 2017/0133693 A1    May 11, 2017

Related U.S. Application Data

(62) Division of application No. 14/041,477, filed on Sep. 30, 2013, now Pat. No. 9,590,257.

(Continued)

(51) Int. Cl.
*H01M 8/02* (2016.01)
*H01M 8/0297* (2016.01)
*H01M 8/04082* (2016.01)
*H01M 8/0234* (2016.01)

(Continued)

(52) U.S. Cl.
CPC ....... *H01M 8/0297* (2013.01); *H01M 8/0232* (2013.01); *H01M 8/0234* (2013.01); *H01M 8/0239* (2013.01); *H01M 8/04201* (2013.01); *H01M 2008/1095* (2013.01); *Y02E 60/50* (2013.01)

(58) Field of Classification Search
CPC ........... H01M 8/04201; H01M 8/0239; H01M 8/0234; H01M 2008/1095; Y02E 60/50
See application file for complete search history.

(56) References Cited

U.S. PATENT DOCUMENTS

| 2002/0144898 A1 | 10/2002 | LaConti et al. |
| 2005/0164068 A1 | 7/2005 | Mann |

(Continued)

FOREIGN PATENT DOCUMENTS

| JP | 2004-510311 A | 4/2004 |
| JP | 2005-317416 A | 11/2005 |

(Continued)

OTHER PUBLICATIONS

PCT International Search Report and Written Opinion dated Jan. 23, 2014 for International Application No. PCT/US2013/062641.

(Continued)

*Primary Examiner* — Cynthia K Walls
(74) *Attorney, Agent, or Firm* — Finnegan, Henderson, Farabow, Garrett & Dunner LLP.

(57) ABSTRACT

An electrochemical cell is disclosed comprising, a first flow structure, a second flow structure, and a membrane electrode assembly disposed between the first and second flow structures. The electrochemical cell further comprises a pair of bipolar plates, wherein the first flow structure, the second flow structure, and the membrane electrode assembly are positioned between the pair of bipolar plates. The electrochemical cell also includes a spring mechanism, wherein the spring mechanism is disposed between the first flow structure and the bipolar plate adjacent to the first flow structure, and applies a pressure on the first flow structure in a direction substantially toward the membrane electrode assembly.

15 Claims, 12 Drawing Sheets

Related U.S. Application Data

(60) Provisional application No. 61/710,073, filed on Oct. 5, 2012.

(51) Int. Cl.
  *H01M 8/0239* (2016.01)
  *H01M 8/0232* (2016.01)
  *H01M 8/1018* (2016.01)

(56) References Cited

U.S. PATENT DOCUMENTS

| | | |
|---|---|---|
| 2007/0184329 A1 | 8/2007 | Kim et al. |
| 2010/0288629 A1 | 11/2010 | LaConti |
| 2013/0048493 A1 | 2/2013 | Tissot et al. |

FOREIGN PATENT DOCUMENTS

| | | |
|---|---|---|
| JP | 2006-070322 A | 3/2006 |
| JP | 2010-250958 A | 4/2010 |
| JP | 2013-120657 A | 6/2013 |
| WO | WO 2002/027813 A2 | 4/2002 |
| WO | WO 2011/036426 A1 | 3/2011 |

OTHER PUBLICATIONS

Notification of Reasons for Rejection issued in Japanese Patent Application No. 2015-535716, dated Apr. 3, 2018 with English translations (4 pages).
Notification of Reasons for Rejection issued in Japanese Patent Application No. 2015-535716, dated Jun. 26, 2017.
EPO Examination Report issued in counterpart EP Application 13774591.5, dated Mar. 17, 2017.

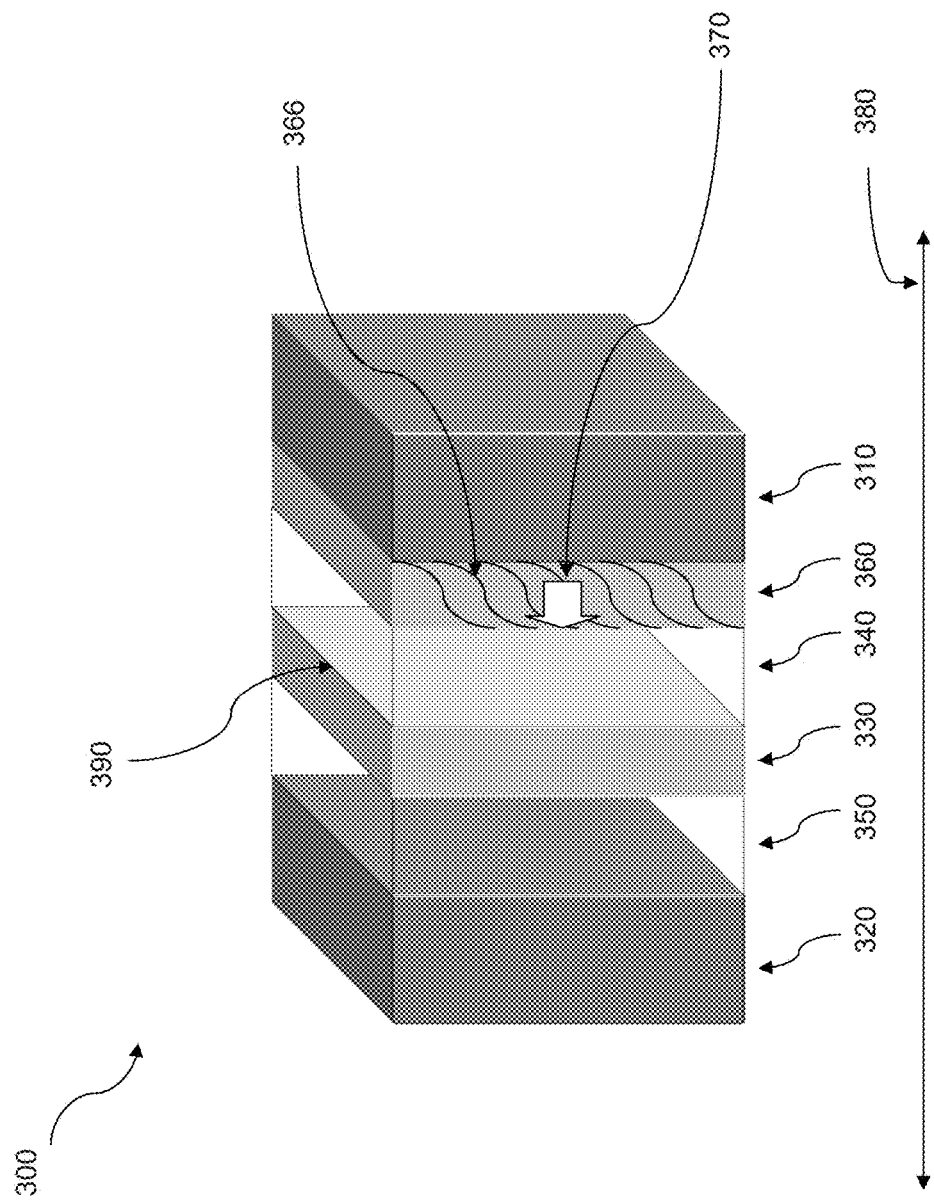

RESILIENT FLOW STRUCTURES FOR ELECTROCHEMICAL CELL

RELATED APPLICATIONS

This application is a divisional application of U.S. application Ser. No. 14/041,477, filed Sep. 30, 2013, which claims the benefit of U.S. Provisional Application No. 61/710,073, filed Oct. 5, 2012, which is incorporated herein by reference.

TECHNICAL FIELD

The present disclosure is directed towards electrochemical cells, and more specifically, the design of resilient flow structures for use in electrochemical cells.

BACKGROUND

Electrochemical cells, usually classified as fuel cells, are devices used for generating electric current from chemical reactions. Fuel cell technology offers a promising alternative to traditional power sources for a range of technologies, for example, transportation vehicles and portable power supply applications. A fuel cell converts the chemical energy of a fuel (e.g., hydrogen, natural gas, methanol, gasoline, etc.) into electricity through a chemical reaction with oxygen or other oxidizing agent. The chemical reaction typically yields electricity, heat, and water. A basic fuel cell comprises a negatively charged anode, a positively charged cathode, and an ion-conducting material called an electrolyte.

Different fuel cell technologies utilize different electrolyte materials. A Proton Exchange Membrane (PEM) fuel cell, for example, utilizes a polymeric ion-conducting membrane as the electrolyte. In a hydrogen PEM fuel cell, hydrogen atoms are electrochemically split into electrons and protons (hydrogen ions) at the anode. The electrochemical reaction at the anode is: $2H_2 \rightarrow 4H^+ + 4e^-$.

The electrons produced by the reaction flow through an electric load circuit to the cathode, producing direct-current electricity. The protons produced by the reaction diffuse through the electrolyte membrane to the cathode. An electrolyte can be configured to prevent the passage of negatively charged electrons while allowing the passage of positively charged ions.

Following passage of the protons through the electrolyte, the protons can react at the cathode with electrons that have passed through the electric load circuit. The electrochemical reaction at the cathode produces water and heat, as represented by: $O_2 + 4H^+ + 4e^- \rightarrow 2H_2O$.

In operation, a single fuel cell can generally generate about 1 volt. To obtain the desired amount of electrical power for a particular application, individual fuel cells are combined to form a fuel cell stack. The fuel cells are stacked together sequentially, each cell including a cathode, an electrolyte membrane, and an anode. Each cathode/membrane/anode assembly constitutes a "membrane electrode assembly" (MEA), which is typically supported on both sides by bipolar plates. Gases (hydrogen and air) are supplied to the electrodes of the MEA through channels or grooves formed in the plates, which are known as flow fields. In addition to providing mechanical support, the bipolar plates (also known as flow field plates or separator plates) physically separate individual cells in a stack while electrically connecting them. The bipolar plates can also act as current collectors, provide access channels for the fuel and the oxidant to the respective electrode surfaces, and provide channels for the removal of water formed during operation of the cell. Typically, bipolar plates are made from metals, for example, stainless steel, titanium, etc., and from non-metallic electrical conductors, for example, graphite.

Additionally, a typical fuel cell stack includes manifolds and inlet ports for directing the fuel and oxidant to the anode and cathode flow fields, respectively. The stack may also include a manifold and inlet port for directing a coolant fluid to interior channels within the stack to absorb heat generated during operation of the individual cells. A fuel cell stack also includes exhaust manifolds and outlet ports for expelling the excess gases and the coolant water.

FIG. 1 is an exploded schematic showing the various components of a PEM fuel cell 10. As shown, bipolar plates 2 flank the MEA, which comprises an anode 7A, a cathode 7C, and an electrolyte membrane 8. Hydrogen atoms supplied to anode 7A are electrochemically split into electrons and protons (hydrogen ions). The electrons flow through an electric circuit (not shown) to cathode 7C and generate electricity in the process, while the protons move through electrolyte membrane 8 to cathode 7C. At the cathode, protons combine with electrons and oxygen (supplied to the cathode) to produce water and heat.

Additionally, PEM fuel cell 10 comprises electrically-conductive gas diffusion layers (GDLs) 5 within the fuel cell on each side of the MEA. GDLs 5 serve as diffusion media enabling the transport of gases and liquids within the cell, provide electrical conduction between bipolar plates 2 and electrolyte membrane 8, aid in the removal of heat and process water from the cell, and in some cases, provide mechanical support to electrolyte membrane 8.

In a typical fuel cell, reactant gases on each side of the electrolyte membrane flow through the flow fields and then diffuse through the porous GDL to reach the electrolyte membrane. Since the flow field and the GDL are positioned contiguously and are coupled by the internal fluid streams, the flow field and the GDL are collectively referred to as "flow structure" hereinafter, unless specified otherwise. It is, however, within the scope of the present disclosure to use traditional channel-type flow fields in combination with three-dimensional porous metallic GDLs, to use three-dimensional porous metallic flow fields in combination with traditional GDLs, or to use three-dimensional porous metallic substrates as both flow fields and GDLs.

The reactant gases on each side of the electrolyte membrane are often present at different pressures, therefore a pressure differential is created across the MEA. The pressure differential creates a force on the MEA that causes the MEA to move away from the high pressure toward the low pressure. A consequence of this movement can be a reduction in contact pressure and separation of the contacting surface of the MEA from the flow structure on the high pressure side. It is believed that reduction in pressure and subsequent separation between the contacting surfaces of the MEA and the high pressure flow structure reduces the electrical conduction and increases the contact resistance between the two reducing the efficiency of the fuel cell. Reduction in contact pressure and separation due to high pressure operation has created a continuing need to improve the design of the flow structures for electrochemical cells to overcome this inefficiency.

The present disclosure is directed toward the design of improved flow structures for use in electrochemical cells. In particular, the present disclosure is directed towards the design of resilient flow structures for use with electrochemical cells. Such devices may be used in electrochemical cells operating under high differential pressures, including, but not limited to fuel cells, electrolysis cells, hydrogen purifiers, hydrogen expanders, and hydrogen compressors.

SUMMARY

One aspect of the present disclosure is directed to an electrochemical cell that can comprise a first flow structure, a second flow structure, and a membrane electrode assembly disposed between the first and second flow structures; wherein the second flow structure has a stiffness greater than the first flow structure.

In another embodiment, the stiffness of the first flow structure and the second flow structure can be measured in a direction substantially parallel to a longitudinal axis running from the center of the first flow structure to the center of the second flow structure. In another embodiment, the first flow structure can be configured to expand elastically relative to a displacement of the membrane electrode assembly caused by a pressure differential between the first flow structure and the second flow structure to allow the first flow structure to maintain physical contact with the membrane electrode assembly. In another embodiment, the first flow structure and the second flow structure can be constructed of materials having substantially the same properties, and a length of the first flow structure can be greater than a length of the second flow structure, wherein the length of the first flow structure and the length of the second flow structure is measured along the longitudinal axis.

In another embodiment, the first flow structure can be constructed of a first material, the second flow structure can be constructed of a second material having an elastic modulus greater than that of the first material, and the length of the first flow structure can be less than the length of the second flow structure, wherein the length of the first flow structure and the length of the second flow structure is measured along the longitudinal axis. In another embodiment, the first flow structure can include at least two layers of material, and at least one of the at least two layers of material has a stiffness less than that of the second flow structure material.

In another embodiment, the at least one second layer can have a length greater than the second flow structure or an elastic modulus less than that of the second flow structure. In another embodiment, the first flow structure can be constructed of a material having a lower elastic modulus than the second flow structure, and a length of the first flow structure can be greater than a length of the second flow structure, wherein the length of the first flow structure and the length of the second flow structure is measured along the longitudinal axis. In another embodiment, the first flow structure can be on the cathode side of the electrochemical cell and the second flow structure can be on the anode side of the electrochemical cell.

In another embodiment, the first flow structure can comprise steel wool. In another embodiment, the first flow structure can comprise metallic foam including nickel chrome. In another embodiment, the first flow structure can comprise at least one of a cloth, a paper, and a wool made of carbon fiber. In another embodiment, a cell resistance measurement for the electrochemical cell when operating at a differential pressure up to 14,000 psi can be less than six times a cell resistance measurement for the electrochemical cell when operating at 0 psi differential pressure.

Another aspect of the present disclosure is directed to an electrochemical cell that can comprise a first flow structure, a second flow structure, and a membrane electrode assembly disposed between the first and second flow structures; a pair of bipolar plates, wherein the first flow structure, the second flow structure, and the membrane electrode assembly are positioned between the pair of bipolar plates; and a spring mechanism, wherein the spring mechanism is disposed between the first flow structure and the bipolar plate adjacent to the first flow structure, and applies a pressure on the first flow structure in a direction substantially toward the membrane electrode assembly.

In another embodiment, the spring mechanism can comprise a plate and at least one spiral disk spring. In another embodiment, the spring mechanism can comprise at least one leaf-type spring. In another embodiment, the spring mechanism can comprise at least one wave spring. In another embodiment, the spring mechanism can comprise at least one dimple plate. In another embodiment, a cell resistance measurement for the electrochemical cell when operating at a differential pressure up to 14,000 psi can be less than six times a cell resistance measurement for the electrochemical cell when operating at 0 psi differential pressure.

Another aspect of the present disclosure is directed to a method of constructing an electrochemical cell that can comprise selecting a first flow structure having an elastic modulus, a cross-sectional area, and a length; selecting a second flow structure having an elastic modulus, a cross-sectional area, and a length; disposing a membrane electrode assembly between the first and second flow structures; positioning the first flow structure, the second flow structure, and the membrane electrode assembly between a pair of bipolar plates; and compressing the first flow structure to a first compression state wherein, the first compression state is based on at least one of the elastic modulus, the length and the cross-sectional area such that the first flow structure will expand to a second expansion state during operation.

In another embodiment, wherein selecting the first flow structure and the second flow structure the elastic modulus of the first flow structure can be substantially the same as the elastic modulus of the second flow structure, while the length of the first flow structure can be greater than the length of the second flow structure making the first flow structure. In another embodiment, wherein selecting the first flow structure and the second flow structure the elastic modulus of the first flow structure can be less than the elastic modulus of the second flow structure, while the length of the first flow structure can be less than or equal to a length of the second flow structure.

In another embodiment, wherein selecting the first flow structure and the second flow structure the elastic modulus of the first flow structure can be less than the elastic modulus of the second flow structure, while the length of the first flow structure can be greater than the length of the second flow structure. In another embodiment, wherein a cell resistance measurement for the electrochemical cell when operating at greater than 14,000 psi differential pressure can be less than six times a cell resistance measurement for the electrochemical cell when operating at 0 psi differential pressure.

Another aspect of the present disclosure is directed to a method of operation for an electrochemical cell that can comprise compressing a first flow structure from a first position to a second position different from the first, wherein the first flow structure remains substantially in contact with a membrane electrode assembly during transition from the first position to the second position; wherein during the transition from the first position to the second position a second flow structure on the opposite side of the membrane electrode assembly remains substantially in contact with the membrane electrode assembly; and pressurizing the first flow structure causes the transition of the first flow structure from the first position to the second position and creates a differential pressure across the membrane electrode assembly.

In another embodiment, a cell resistance measurement for the electrochemical cell when operating at a differential pressure up to 14,000 psi can be less than 6 times a cell resistance measurement for the electrochemical cell when operating at 0 psi differential pressure. In another embodiment, wherein the second flow structure can have a stiffness greater than the first flow structure.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the present disclosure and together with the description, serve to explain the principles of the disclosure.

FIG. 3C is a schematic view of part of an electrochemical cell, according to an exemplary embodiment including a leaf spring mechanism.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts. Although described in relation to a PEM fuel cell employing hydrogen, oxygen, and water, it is understood that the devices and methods of the present disclosure can be employed with various types of electrochemical cells, including those operating under high differential pressures.

The present disclosure is directed towards the design of resilient flow structures for use in electrochemical cells. In such electrochemical cells, the resilient flow structures are configured such that sufficient contact pressure between each flow structure and the MEA may be generally maintained in order to maintain adequate cell electrical conduction and reduce cell resistance across a range of pressure differentials.

Figure 1:
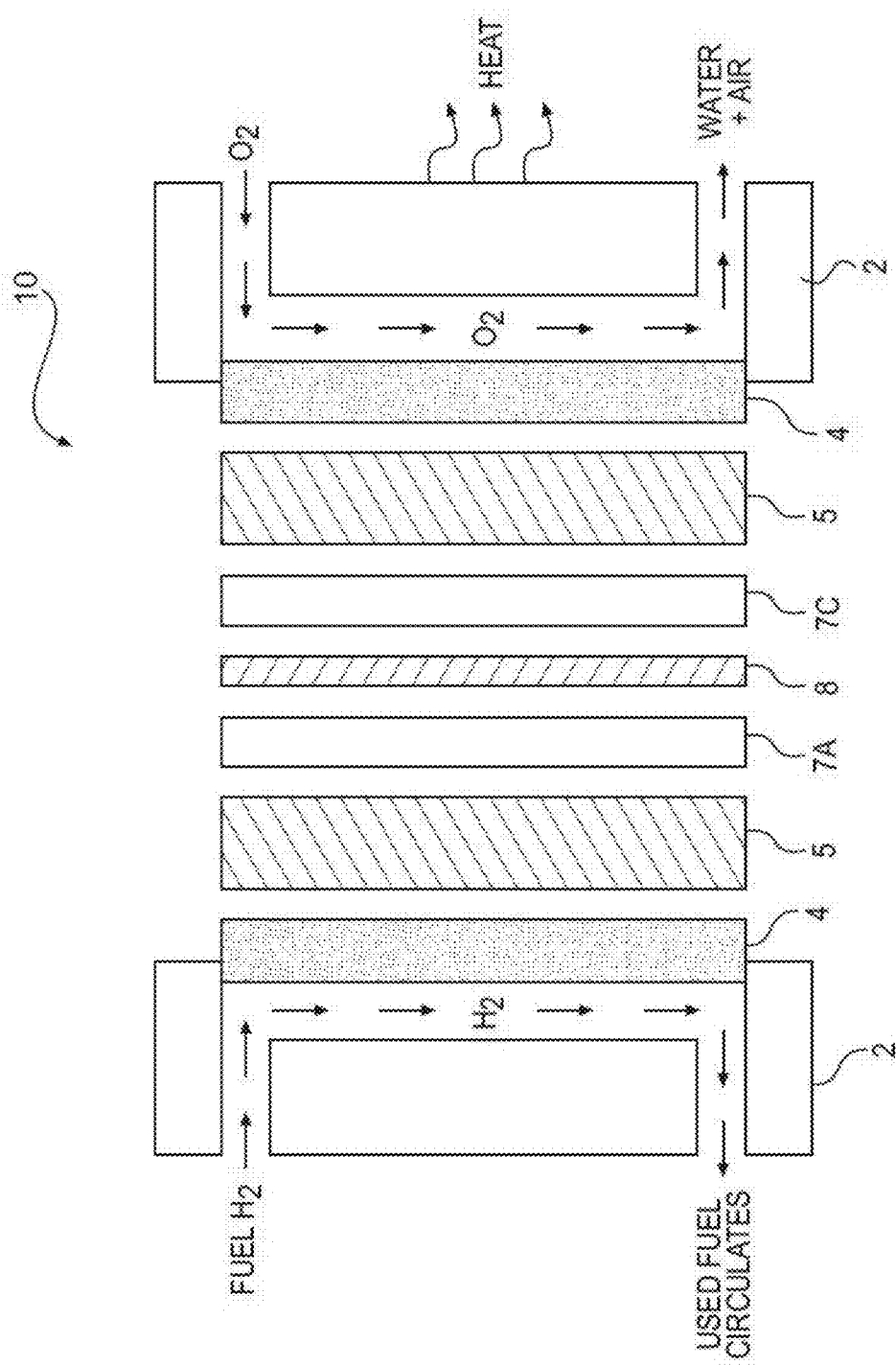
FIG. 1 is an exploded schematic view of a fuel cell, showing the various components of a Proton Exchange Membrane (PEM) fuel cell.
Figure 2:
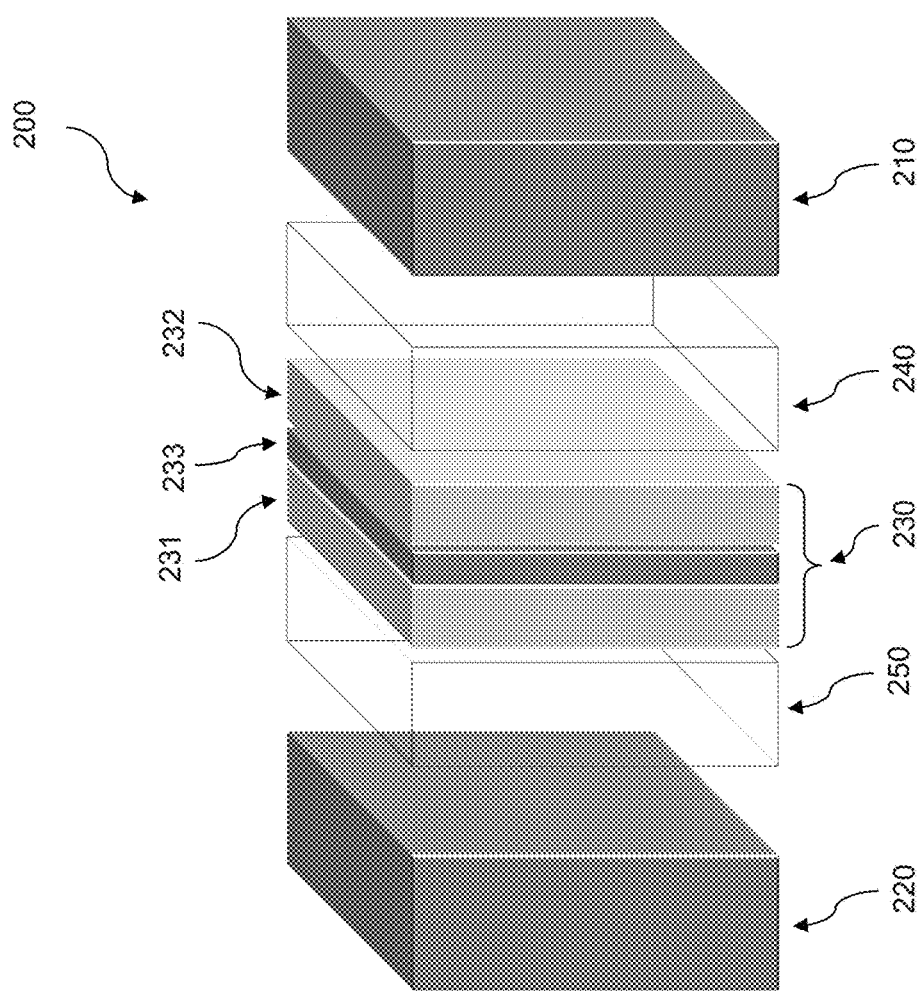
FIG. 2 is a schematic view of part of an electrochemical cell, according to an exemplary embodiment.

FIG. 2. is an exploded schematic of a PEM fuel cell 200, according to an exemplary embodiment. The fuel cell 200 can comprise two bipolar plates 210, 220. Bipolar plate 210 is positioned on the high pressure-side and bipolar plate 220 is positioned on the low pressure-side of fuel cell 200. The bipolar plates can be made from aluminum, steel, stainless steel, titanium, copper, Ni—Cr alloy, or any other electrically conductive material.

In addition to bipolar plates 210, 220, fuel cell 200 can comprise a membrane electrode assembly ("MEA") 230, which can be flanked by a first flow structure 240 on the right and a second flow structure 250 on the left. As shown, first flow structure 240 is disposed between MEA 230 and bipolar plate 210, while second flow structure 250 is disposed between MEA 230 and bipolar plate 220. Bipolar plates 210, 220 separate fuel cell 200 from the neighboring fuel cells (not shown) in the fuel stack. In some other embodiments (not shown), two adjacent fuel cells in a cell stack can share a bipolar plate.

MEA 230 can comprise an anode 231, a cathode 232, and a PEM 233. PEM 233 can be disposed between anode 231 and cathode 232 electrically insulating the anode and the cathode from each other. PEM 233 can comprise a pure polymer membrane or composite membrane where other material, for example, silica, heteropolyacids, layered metal phosphates, phosphates, and zirconium phosphates can be embedded in a polymer matrix. PEM 233 can be permeable to protons while not conducting electrons. Anode 231 and cathode 232 can comprise porous carbon electrodes containing a catalyst. The catalyst material, for example platinum, can speed up the reaction of oxygen and fuel. MEA 230 dimensions can be scaled up or down depending on the application and load requirements. MEA 230 thickness can be based on the thickness of PEM 233 as well as the concentration of catalyst material in anode 231 and cathode 232.

First flow structure 240 and second flow structure 250 provide electrical conduction between bipolar plates 210, 220 and MEA 230 while also providing a media for transport of gases and liquids within fuel cell 200. In addition, first flow structure 240 and second flow structure 250 can provide mechanical support to MEA 230.

First flow structure 240 and second flow structure 250 can comprise "frit"-type densely sintered metals. In addition, layered flow structures (i.e., screen packs and expanded metals) can also be used. Use of three dimensional porous substrates fabricated from metal foams or other porous metallic substrates is also possible. The porous metallic material can comprise a metal, such as, stainless steel, titanium, aluminum, nickel, iron, etc. or a metal alloy, such as, nickel chrome alloy, etc. In high pressure or high differential pressure cells, metal foams or three-dimensional porous metallic substrates can be used as a replacement for traditional channel-type flow fields.

In certain embodiments, the high pressure flow structure can be comprised of a metallic wool, such as steel wool. The wool flow structure can be made of varying grades of steel or can be made of other metals, such as, stainless steel, titanium, aluminum, nickel, iron, nickel-chrome, or another metal alloy. In addition, the wool flow structure can be made from metals with corrosion-resistant coating, such as, carbon, gold, titanium-nitride. In other embodiments, the flow structure can be made from carbon fibers in the form of a cloth, paper, or wool flow structure.

In exemplary embodiments, fuel cell 200 can be used for high differential pressure operations, during which, first flow structure 240 in fuel cell 200 is exposed to higher fluid pressure during operation than the second flow structure 250 on the opposing side of MEA 230. For the purposes of the present disclosure, first flow structure will constitute the "high pressure flow structure" and the second flow structure will constitute the "low pressure flow structure."

It is contemplated that fuel cell 200 can operate at a differential pressure up to 15,000 psi. Such operating conditions may cause the flow structures in fuel cell 200 to compress to a stress level equal to or greater than about 15,000 psi. In exemplary embodiments of high differential pressure fuel cells, the low pressure flow structure (i.e., second flow structure 250 or anode side of the fuel cell) can be formed with a density greater than that of the high pressure flow structure (i.e., first flow structure 240 or cathode side of the fuel cell).

As described above, first flow structure 240 and second flow structure 250 can provide mechanical support to MEA 230 in addition to serving as the medium for electrical conduction between bipolar plates 210, 220 and MEA 230. In an exemplary embodiment, the high pressure fluid acting on MEA 230 from the first flow structure 240 on the high pressure side can be opposed by the structural support provided by second flow structure 250 on the low pressure side.

Figure 3A:
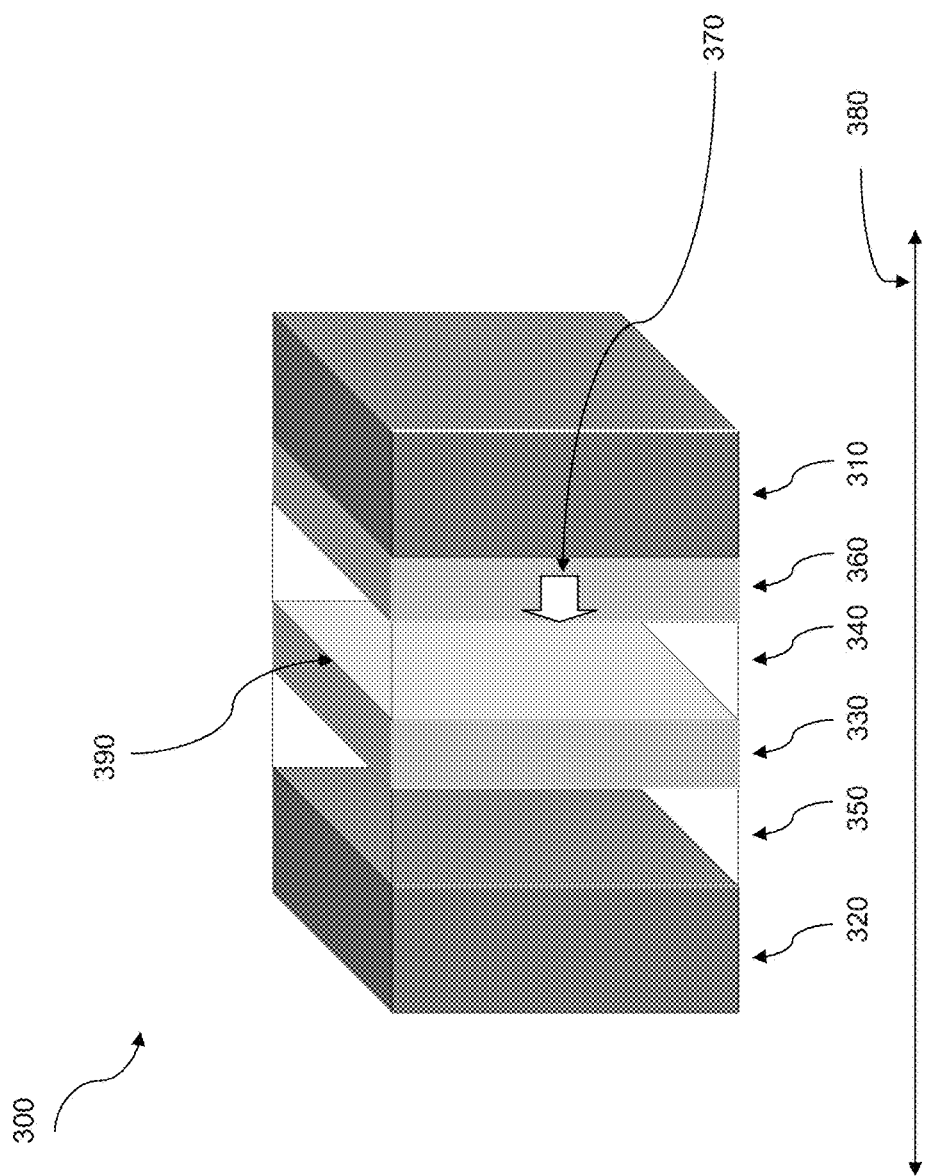
FIG. 3A is a schematic view of part of an electrochemical cell, according to an exemplary embodiment including a spring mechanism.

FIG. 3A illustrates an exemplary embodiment of fuel cell 300. As in FIG. 2, fuel cell 300 may comprise two bipolar plates 310 and 320, a MEA 330, a first flow structure 340, and a second flow structure 350. However, the embodiment disclosed in FIG. 3A can also include a spring mechanism 360. Spring mechanism 360 can be installed between first flow structure 340 and high pressure bipolar plate 310.

Figure 3B:
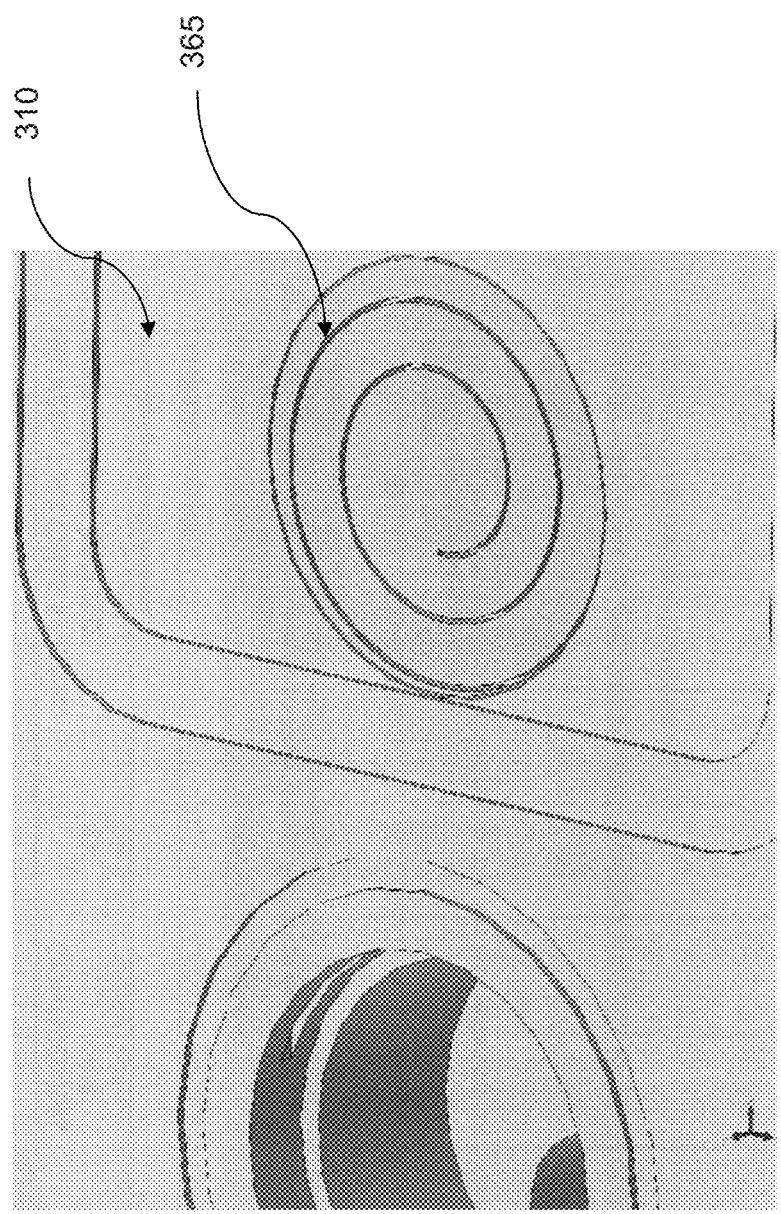
FIG. 3B is an illustration of part of a bipolar plate and spring mechanism, according to an exemplary embodiment.
Figure 3D:
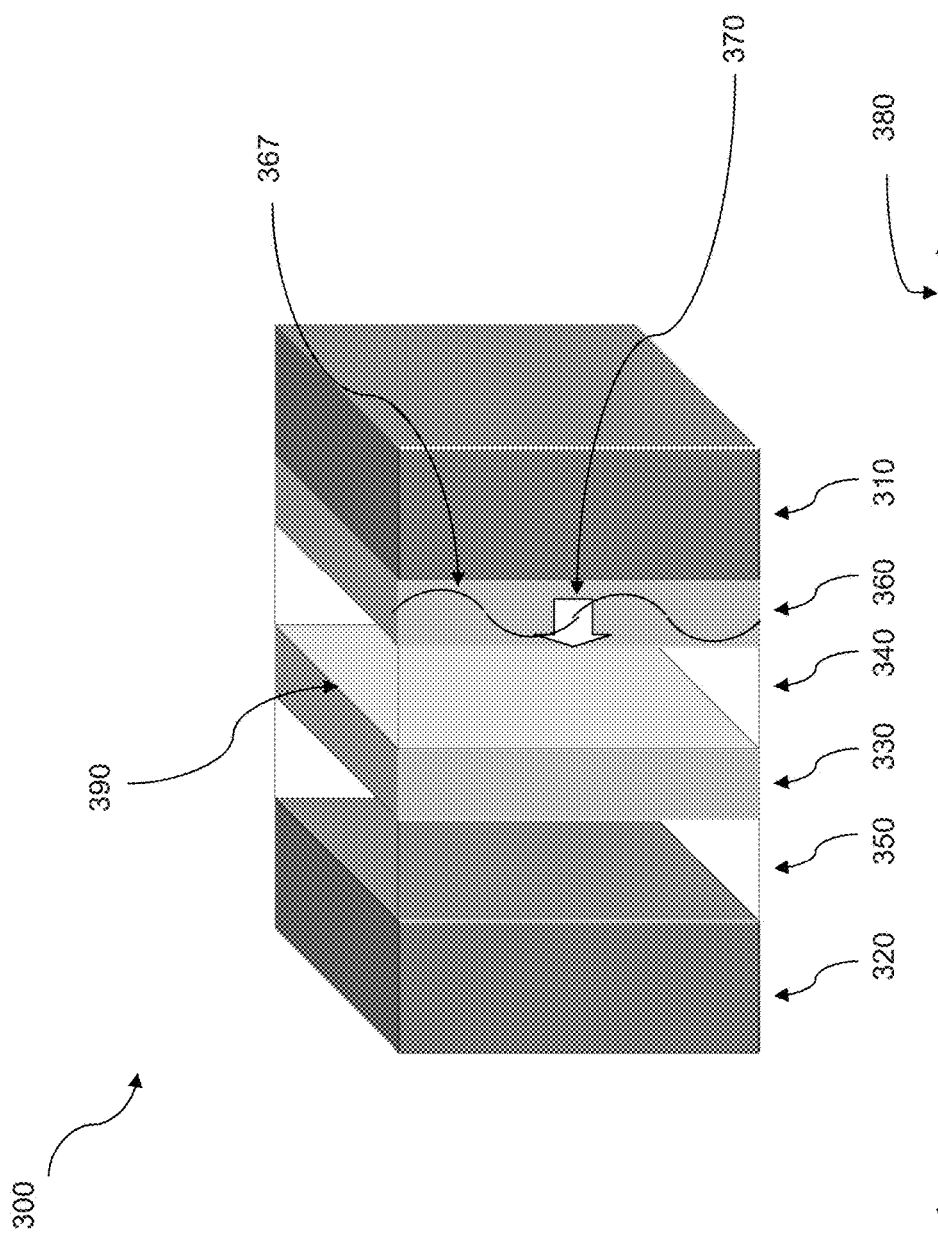
FIG. 3D is a schematic view of part of an electrochemical cell, according to an exemplary embodiment including a wave spring mechanism.
Figure 3E:
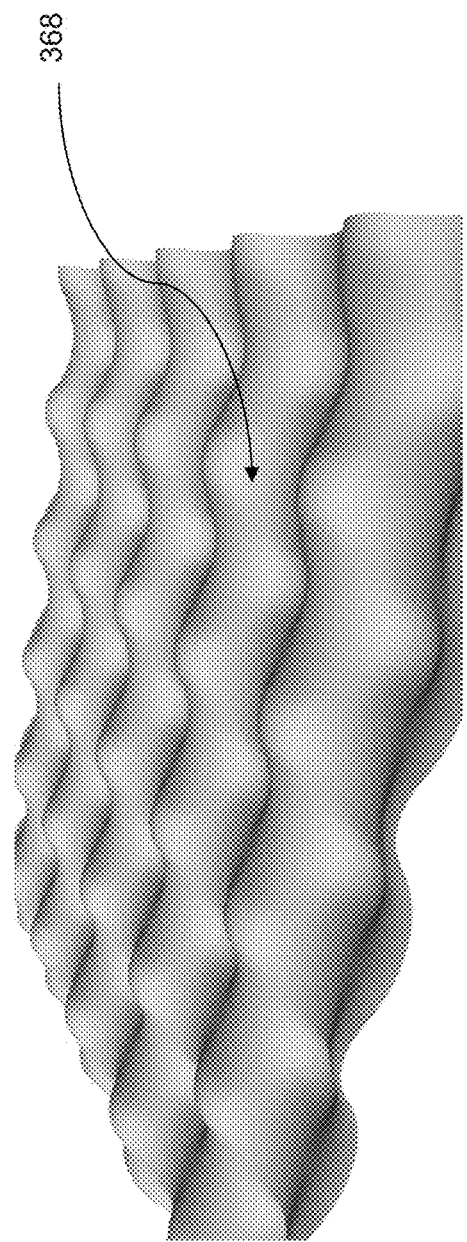
FIG. 3E is an illustration of a dimple plate, according to an exemplary embodiment.

Spring mechanism 360 can comprise, for example, a spiral disk spring 365 as shown in FIG. 3B, a leaf-type spring 366 as shown in FIG. 3C, a wave spring 367 as shown in FIG. 3D, a dimple plate 368 as shown in FIG. 3E, or other equivalent mechanisms. Spring mechanism 360 can be configured to apply a force 370 substantially parallel to a longitudinal axis 380 of first flow structure 340. When fuel cell 300 is operating at a high pressure (i.e., up to 15,000 psi) and consequently a high differential pressure, as described above, the low pressure flow field will flex and become thinner as MEA 330 moves toward the low pressure side due to the driving force of the cathode side pressure. To limit the reduction in contact pressure and separation at a contact surface 390, between MEA 330 and the first flow structure 340, the spring mechanism 360 can exert force 370 on the first flow structure so that the first flow structure moves toward the low pressure side of fuel cell 300, in effect, following the movement of MEA 330. Spring mechanism 360 can be made of aluminum, steel, stainless steel, titanium, copper, Ni—Cr alloy, carbon fiber or any other equivalent structural and electrically conductive material.

FIG. 3B illustrates an exemplary embodiment of spring mechanism 360, wherein spring mechanism 360 can comprise a plate 310 and at least one spiral disk spring 365. A plurality of spiral disk spring 365 can be used. Plate 310 can be configured to be a substantially flat plate 310 with at least one or a plurality of recesses in the plate and each recess can be suitable to receive one spiral disk spring 365. Plate 310 and spiral disk spring 365 can form an assembly, which can be placed between bipolar plate 310 and first flow structure 340. The plate 310 can uniformly distribute the force of the one or more spiral disk spring 365 on the adjacent first flow structure 340. In an alternative embodiment (not shown), the spiral disk spring 365 or plurality of springs can be etched into flat plate 310. The dimensions of spiral disk spring 365 and plate 310 can be such that the overall thickness of the fuel cell 300 is not substantially increased.

In an exemplary embodiment spring mechanism 360 can act as an electrical conduction medium between first flow structure 340 and bipolar plate 310 to limit increase in cell resistance by separation of contacting surface 390.

In addition, spring mechanism 360 can be comprised of multiply individual springs or can include a single spring. Spring mechanism 360 can be configured to provide a uniform force across the entire first flow structure 340. The spring mechanism 360 can have a constant or variable spring constant. The spring mechanism can be dampened to allow the fuel cell position to return to equilibrium quickly or limit oscillations caused by variations in fuel cell pressure.

FIG. 3E illustrates an exemplary embodiment of spring mechanism 360, wherein spring mechanism can comprise of a dimple plate 368. The dimple plate can be formed by stamping a foil with dimple protrusions. The dimple plate can exhibit spring like properties. The dimple plate can be made from aluminum, steel, stainless steel, titanium, copper, Ni—Cr alloy, or other electrically conductive material. One or more dimple plates can be used to produce force 370.

Figure 4:
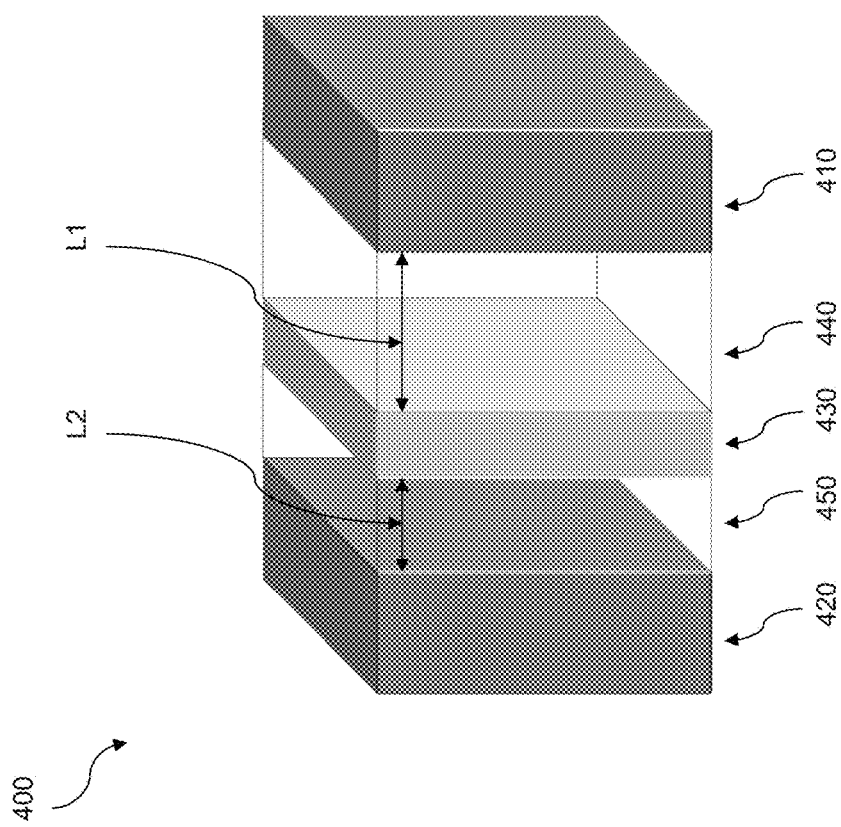
FIG. 4 is a schematic view of part of an electrochemical cell, according to an exemplary embodiment.

FIG. 4 shows an alternate embodiment of fuel cell 400. As in FIGS. 2 and 3A, fuel cell 400 may comprise two bipolar plates 410 and 420, a MEA 430, a first flow structure 440, and a second flow structure 450. However, the embodiment disclosed in FIG. 4 does not utilize a spring mechanism as illustrated in FIG. 3A. Instead, the first flow structure 440 can be configured such that first flow structure 440 functions substantially similar to that of a spring by exhibiting more flexible structural properties relative to second flow structure 450, which exhibits stiffer structural properties.

The stiffness of a material element is a property of the structure of that element. That is, the stiffness (k) is a function of the cross-sectional area (A), the element length (L), and the elastic modulus (E), as shown in equation (1) below.

$$k = \frac{AE}{L} \quad (1)$$

The stiffness of a structure or element can affect design, so the modulus of elasticity can affect material selection. A high modulus of elasticity can be sought when deflection or compression is undesirable, while a low modulus of elasticity can be sought when flexibility or expansion is needed.

As shown in FIG. 4, first flow structure 440 can have a length L1 greater than a length L2 of second flow structure 450. Based on equation (1), two elements with the same cross-sectional area and same elastic modulus will have a difference in stiffness (k) that is dependent on the difference in length of the elements. For example, if first flow structure 440 has a length L1 that is double the length L2 of second flow structure 450, the result will be that second flow structure 450 will be twice as "stiff" as the first flow structure.

First flow structure 440 and second flow structure 450 as shown in FIG. 4 have substantially the same cross-sectional area and substantially the same elastic modulus. Therefore, first flow structure 440 and second flow structure 450 can operate within fuel cell 400 as follows. As differential pressure builds across MEA 430, the force created by the pressure will cause MEA 430 to move towards second flow structure 450. In the case of the embodiment shown in FIG. 4, second flow structure 450 is substantially "stiffer" than that of first flow structure 440. The "stiffer" second flow structure 450 will slightly compress and elastically deform as a result of the force created by the differential pressure. While, the second flow structure 450 can undergo minimal compression, the "springy" first flow structure 440 can flex or expand more significantly in response to the movement of MEA 430. The expansion of first flow structure 440 corresponding to the movement of MEA 430 can maintain the contact pressure and electrical conduction between MEA 430 and first flow structure 440 as fuel cell 400 differential pressure increases.

In an alternate embodiment, first flow structure 440 and second flow structure 450 as shown in FIG. 4 have substantially the same cross-sectional area, first flow structure 440 has an elastic modulus less than that of second flow structure 450, and first flow structure 440 length L1 is greater than length L2 of second flow structure 450. Based on equation (1), second flow structure 450 will be stiffer than first flow structure 450 because of both the difference in length and elastic modulus of first flow structure 440 and second flow structure 450.

Figure 5:
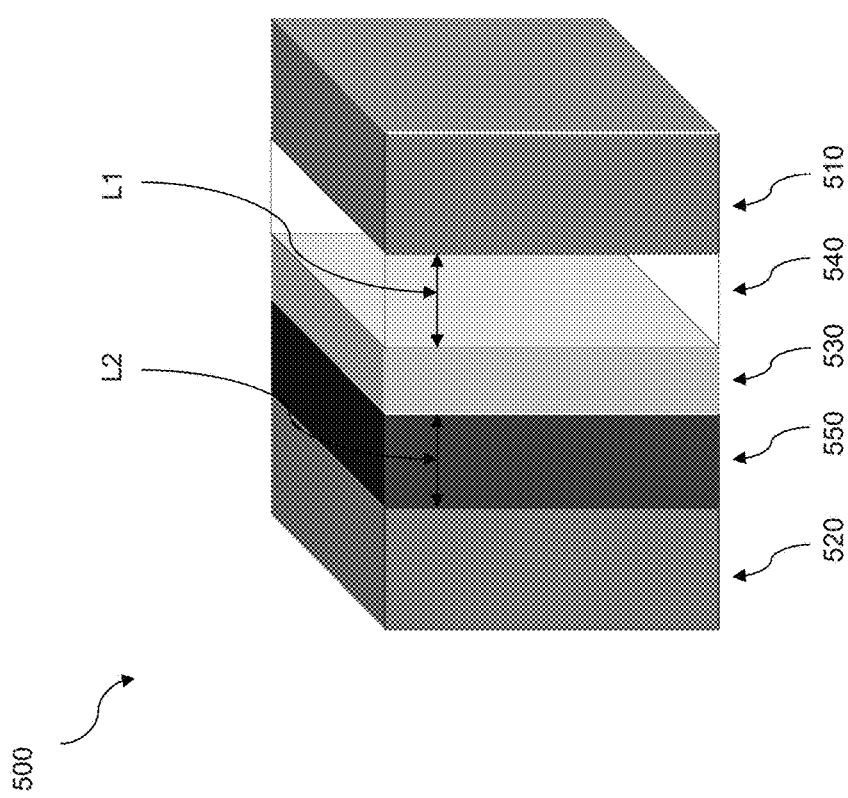
FIG. 5 is a schematic view of part of an electrochemical cell, according to an exemplary embodiment.

FIG. 5 shows an alternate embodiment of fuel cell 500. As in FIG. 4, fuel cell 500 may comprise two bipolar plates 510 and 520, a MEA 530, a first flow structure 540, and a second flow structure 550. However, the embodiment shown in FIG. 5 includes first flow structure 540 and second flow structure 550 having different material compositions. For example, first flow structure 540 can comprise material with an elastic modulus less than that of the second flow structure 550. Based on equation (1), the length L1 of first flow structure 550 can be substantially equal to the length L2 of the second flow structure 550 and still exhibit "springy" physical properties in relation to the "stiffer" second flow field 550 depending on the difference in the elastic modulus for first flow structure 540 and second flow structure 550. For example, if both first and second flow structures 540, 550 have the same cross-sectional area (A) and the same length (L), but first flow structure 540 has an elastic modulus half the value of the elastic modulus for second flow structure 550, than second flow structure 550 will be about twice as "stiff" as first flow structure 540.

Based on equation (1), first flow structure 540 length L1 can be less than second flow structure 550 length L2 and still exhibit "springy" physical properties in relation to the "stiffer" second flow structure 550. For example, if the cross-sectional area (A) of both flow structure is the same, the length L2 of second flow structure 550 is about twice the length L1 of first flow structure 540, and first flow structure 540 has an elastic modulus a quarter of second flow structure 550 than second flow structure 550 will be about twice as "stiff" as first flow structure 540.

Figure 6:
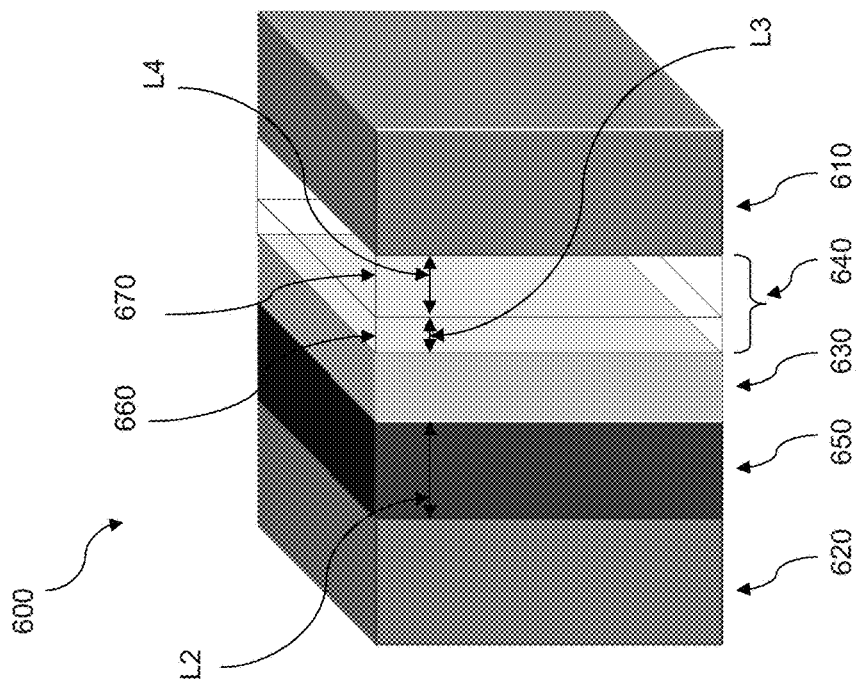
FIG. 6 is a schematic view of part of an electrochemical cell, according to an exemplary embodiment.

FIG. 6 shows an alternate embodiment of fuel cell 600. As in FIG. 4 and FIG. 5, fuel cell 600 can comprise two bipolar plates 610 and 620, a MEA 630, a first flow structure 640, and a second flow structure 650. However, the embodiment disclosed in FIG. 5, first flow structure 640 can comprise two layers, first layer 660 and second layer 670, laminated or otherwise coupled, wherein the two layers that comprise first flow structure 640 when combined are "springy" compared to the relative "stiff" second flow structure. For example, first layer 660 can be comprised of a material with an elastic modulus less than that of second flow structure 650 and second layer 670 can have a length L4 greater than length L2 of second flow structure 650. In addition, first layer 660 can be comprised of material with an elastic modulus less than that of second flow structure 650 and second layer 670 can have an elastic modulus greater than that of second flow structure 650.

The examples of the different possible constructions between the first flow structure and second flow structure presented are exemplary only, and the present disclosure is not limited to the examples given, instead the present disclosure includes all variations of which the first and second flow structures could be constructed to achieve a desired ratio of stiffness between the first and second flow structures.

In various embodiments based on equation (1), the modulus of elasticity and the length of the first flow structure and the second flow structure can be changed to optimize the compliance ratio between the two flow structures. Proper compliance ratio ensures that contact pressure between the MEA and each flow structure is maintained through the full range of differential operating pressure, limiting an increase in cell resistance.

Additional factors that can be considered in designing the flow structures beyond just the elastic modulus can include the pore size of the material, surface roughness, thermal resistivity, electrical conductivity, corrosion resistance, etc.

As discussed above with regard to equation (1), varying the length (L) and elastic modulus (E) of a material element will affect the stiffness of the flow structure. In other embodiments, the cross-sectional area (A) could be modified in order to alter the stiffness (k) of a flow structure. For example, rather than varying the length or elastic modulus of the flow structures the cross-section area may be varied to achieve a beneficial stiffness or compliance ratio for the flow structures. In addition to varying the cross-sectional area (A), the flow structures can comprise a non-uniform cross-sectional area (A), which can vary in area along the length of the flow structure. For example, a flow structure with a non-uniform cross-sectional area along the length of the flow structure can have convex ends, which under pressure flatten out increasing the contact surface area for the flow structure at each end.

Figure 7:
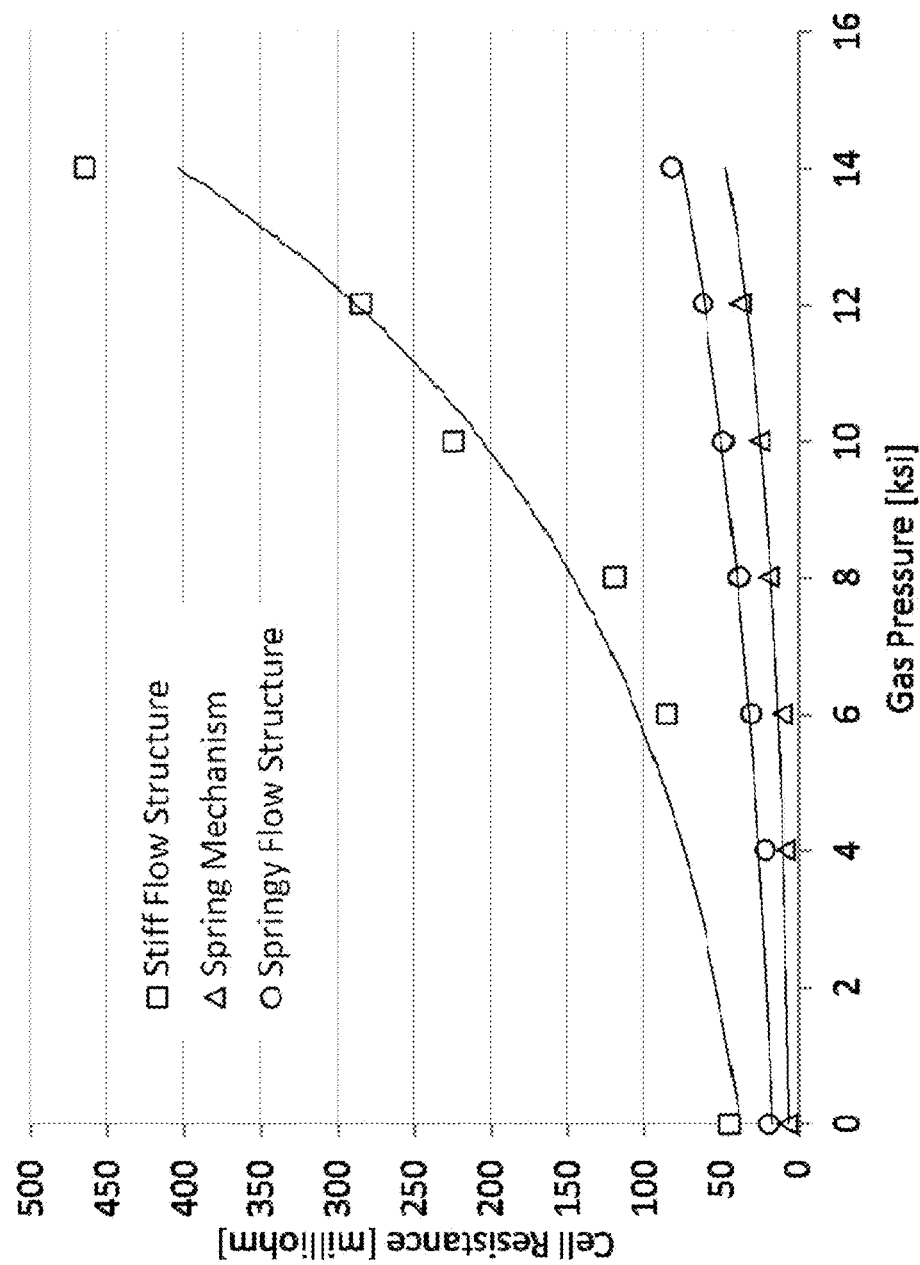
FIG. 7 is a graph illustrating cell resistance vs. pressure applied to cathode for three flow structure combinations, according an exemplary embodiment.

Application of embodiments described above can allow for improved performance of electrochemical cells, particularly electrochemical cells operating under high pressure conditions. Preliminary testing has demonstrated that a resilient cathode flow structure can limit the increase in cell resistance as operating pressure increases within the electrochemical cell. FIG. 7 is a graph illustrating the results of testing three different flow structure configurations. The three flow structure configurations comprise a stiff anode flow structure combined with three different cathode flow structure configurations. The three different cathode flow structure configurations comprise a stiff flow structure, a spring mechanism, and a springy flow structure. The stiff flow structure comprises a metallic foam cathode flow structure. The spring mechanism comprises a dimple plate as described in an exemplary embodiment. The springy flow structure comprises a flow structure with an elastic modulus less than that of the anode flow structure and a length greater than that of the anode flow structure. The cell consisted of the anode and cathode flow structures indicated above along with an anode electrode, a cathode electrode and a proton conducting membrane. Two bipolar plates were used to encapsulate the cell and structural compression plates and tie roads were used to compress the cell and engage the gas seals.

The testing included pressurizing the cathode side of the electrochemical cell with gas up to a pressure of at least 13,000 psi. The cell resistance was measured using an AC milliohm-meter as the pressure was increased for each flow structure configuration. The test results are illustrated in FIG. 7, which shows plots of cell resistance versus pressure applied to the cathode. FIG. 7 shows that the stiff flow structure experienced the largest increase in cell resistance as a result of increased pressure to the cathode by increasing from about 45 milliohm to about 465 milliohm. The springy flow structure performed better than the stiff flow structure, but not as well as the spring mechanism. The spring mechanism performed the best during the test. During testing of the spring mechanism the cell resistance increased from about 7 milliohm to about 38 milliohm.

In addition to spring mechanism exhibiting the lowest increase in cell resistance, the initial resistance of spring mechanism is less than that of any of the other flow structures tested.

FIG. 7 illustrates that the combination of a "stiff" anode flow structure and a cathode flow structure that is either "springy" or combined with a spring mechanism can limit the increase in cell resistance with regard to pressure enabling better electrochemical cell performance and efficiency.

Figure 8:
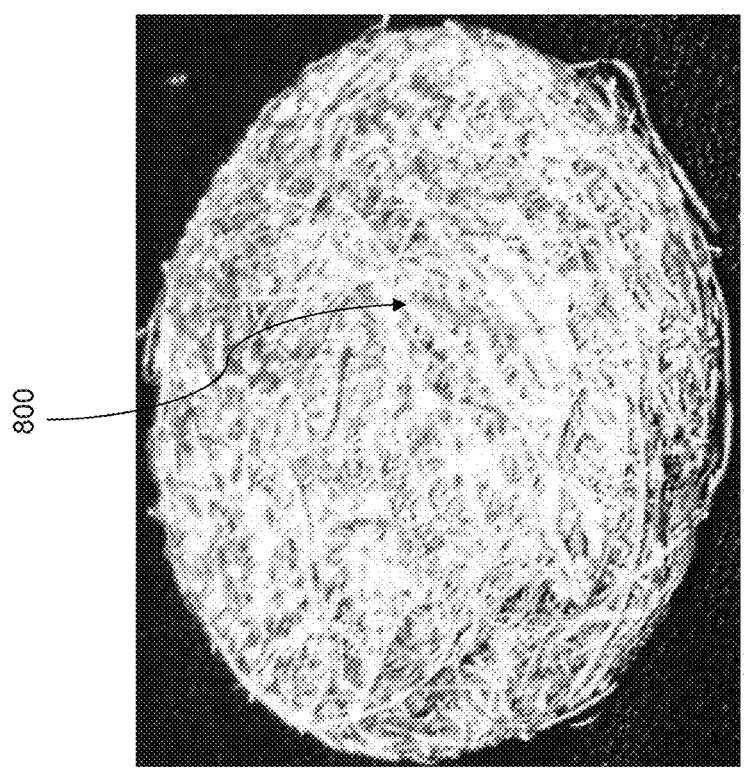
FIG. 8 is a picture of a steel wool flow structure, according to an exemplary embodiment.

FIG. 8 shows a picture of a steel wool flow structure 800, according to an exemplary embodiment. The steel wool flow structure 800 can be comprised of a plurality of fine soft steel filaments spun and bundled together into a pad. The steel wool flow structure 800 peripheral geometry and thickness can be varied based on the cell design and application. In alternative embodiments a wool flow structure can be made of varying grades of steel filaments or can be made of other electrically conductive filaments, such as, stainless steel, titanium, aluminum, nickel, iron, nickel-chrome, another metal alloy, or carbon fibers. Alternative embodiments can include different structures with substantially similar properties, for example, metal foams comprised of different metal alloys.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of operation for an electrochemical cell comprising:
   compressing a first flow structure from a first position to a second position different from the first position, wherein the first flow structure remains substantially in contact with a membrane electrode assembly during transition from the first position to the second position; wherein
   during the transition from the first position to the second position a second flow structure on the opposite side of the membrane electrode assembly remains substantially in contact with the membrane electrode assembly; and
   pressurizing the first flow structure causes the transition of the first flow structure from the first position to the second position and creates a differential pressure across the membrane electrode assembly;
   wherein the first flow structure is constructed of a material having a lower elastic modulus than the second flow structure and a length of the first flow structure is greater than a length of the second flow structure with the length of the first flow structure and the length of the second flow structure is measured along the longitudinal axis.

2. The method according to claim 1, wherein a cell resistance measurement for the electrochemical cell when operating at a differential pressure up to 14,000 psi is less than 6 times a cell resistance measurement for the electrochemical cell when operating at 0 psi differential pressure.

3. The method according to claim 1, wherein the second flow structure has a stiffness greater than the first flow structure.

4. The method according to claim 1, wherein a stiffness of the first flow structure and the second flow structure is measured in a direction substantially parallel to a longitudinal axis running from a center of the first flow structure to a center of the second flow structure.

5. The method according to claim 1, wherein the first flow structure includes at least two layers of material, and at least one of the at least two layers of material has a stiffness less than that of the second flow structure material.

6. The method according to claim 5, wherein the at least one second layer has a length greater than the second flow structure or an elastic modulus less than that of the second flow structure.

7. The method according to claim 1, wherein the first flow structure is on a cathode side of the electrochemical cell and the second flow structure is on an anode side of the electrochemical cell.

8. The method according to claim 1, wherein the first flow structure comprises at least one of steel wool, a metallic foam, and a wool made of carbon fiber.

9. A method of operation for an electrochemical cell comprising:
   compressing a first flow structure from a first position to a second position different from the first position, wherein the first flow structure remains substantially in contact with a membrane electrode assembly during transition from the first position to the second position; wherein
   during the transition from the first position to the second position a second flow structure on the opposite side of the membrane electrode assembly remains substantially in contact with the membrane electrode assembly; and
   pressurizing the first flow structure causes the transition of the first flow structure from the first position to the second position and creates a differential pressure across the membrane electrode assembly;
   wherein the first flow structure includes at least two layers of material, and at least one of the at least two layers of material has a stiffness less than that of the second flow structure material.

10. The method according to claim 9, wherein the at least one second layer has a length greater than the second flow structure or an elastic modulus less than that of the second flow structure.

11. The method according to claim 9, wherein the first flow structure is on a cathode side of the electrochemical cell and the second flow structure is on an anode side of the electrochemical cell.

12. The method according to claim 9, wherein the first flow structure comprises at least one of steel wool, a metallic foam, and a wool made of carbon fiber.

13. A method of operation for an electrochemical cell comprising:
   compressing a first flow structure from a first position to a second position different from the first position, wherein the first flow structure remains substantially in contact with a membrane electrode assembly during transition from the first position to the second position; wherein during the transition from the first position to the second position a second flow structure on the opposite side of the membrane electrode assembly remains substantially in contact with the membrane electrode assembly; and pressurizing the first flow structure causes the transition of the first flow structure from the first position to the second position and creates a differential pressure across the membrane electrode assembly;

wherein the first flow structure comprises at least one of steel wool, a metallic foam, and a wool made of carbon fiber.

14. The method according to claim 13, wherein the at least one second layer has a length greater than the second flow structure or an elastic modulus less than that of the second flow structure.

15. The method according to claim 13, wherein the first flow structure is on a cathode side of the electrochemical cell and the second flow structure is on an anode side of the electrochemical cell.

* * * * *